Patented Jan. 8, 1952

2,581,905

UNITED STATES PATENT OFFICE 2,581,905

BIVALENT METAL HALIDE ADDITION COMPOUNDS OF SUBSTITUTED SULFENAMIDES

Edward L. Carr, Akron, Ohio, and John Richard Rafter, Bristol Ferry, R. I., assignors to The Firestone Tire & Rubber Company, Akron, Ohio, a corporation of Ohio No Drawing. Application July 9, 1949, Serial No. 103,946

17 Claims. (Cl. 260—299)

1

This invention relates to bivalent metal halide addition compounds of sulfenamides which are accelerators of the vulcanization of rubbers. Examples are the metal halide addition compounds of the thiazoline sulfenamides, the metal halide addition compounds of the thiazole sulfenamides, and the metal halide addition compounds of the thiocarbamyl sulfenamides. They are represented by the following formulas:

I 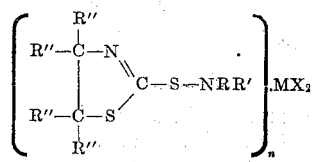

II 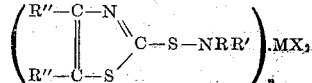

III 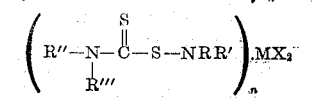

in which R, R', and R'', which may all be the same or different, are hydrogen or a hydrocarbon alkyl (including hydrocarbon cycloalkyl), hydrocarbon aryl or hydrocarbon aralkyl substituent or furfuryl or tetrahydrofurfuryl or NRR' may be a heterocyclic group in which RR' is alkylene or alkylene-oxy-alkylene as in diethylene-oxy, as for example, piperidyl, morpholyl, etc.; R''' is a hydrocarbon alkyl (including hydrocarbon cycloalkyl), hydrocarbon aryl or hydrocarbon aralkyl substituent or furfuryl or tetrahydrofurfuryl; and $MX_2$ is a complex-forming halide salt of a bivalent metal, such as zinc, copper, cadmium, etc., and X is chlorine, bromine or iodine. Furthermore, in Formula II the R'' may be joined with the double-bonded carbons to form an arylene group, such as benzo-, tetrahydrobenzo-, etc., and in Formula III the R'' and R''' may join with the nitrogen to form a heterocyclic group in which R''R''' is alkylene or alkylene-oxy-alkylene, such as piperidyl, morpholyl, etc. The subscript $n$ is 1 or 2.

Typical compounds are the zinc chloride, etc., addition compounds of:

N-furfuryl thiazoline sulfenamide
N-methyl thiazoline sulfenamide
N,N-diethyl thiazoline sulfenamide
N-cyclohexyl thiazoline sulfenamide
N-cyclohexyl-4-methyl thiazoline sulfenamide
N-cyclohexyl-4,5-dimethyl thiazole sulfenamide
N-isopropyl-4-5-dimethyl thiazole sulfenamide

2

N-cyclohexyl-4-ethyl thiazole sulfenamide
N-ethyl-4-ethyl thiazole sulfenamide
N,N-diethyl-4,5-dimethyl thiazole sulfenamide
N,N-ditetrahydrofurfuryl thiazole sulfenamide
N,N-diethyl diethylthiocarbamyl sulfenamide
N - cyclopentamethylene - cyclopentamethylene thiocarbamyl sulfenamide
N-cyclohexyl dimethylthiocarbamyl sulfenamide
N,N-dicyclohexyl naphthothiazole sulfenamide
N-isopropyl benzothiazole sulfenamide
N-cyclohexyl benzothiazole sulfenamide
N-methyl benzothiazole sulfenamide
N,N-ditetrahydrofurfuryl ditetrahydrofurfuryl thiocarbamyl sulfenamide Each of the above-mentioned sulfenamides may be produced by any of the usual sulfenamide preparation reactions which employ water-soluble amines. However, the invention is not limited to such sulfenamides but includes the addition products of all sulfenamides suitable for use in plastics. Sulfenamides produced from insoluble amines, such as sulfenamides with aromatic substituents, long-chain aliphatic substituents, etc., may be produced by metathesis. For example, N-dodecyl benzothiazole sulfenamide may be produced by dissolving benzothiazole sulfenamide in dodecyl amine and allowing the mixture to stand until the reaction has taken place. Similarly, N-phenyl thiazoline sulfenamide, N-tolyl thiazole sulfenamide, and N-phenyl dimethylthiocarbamyl sulfenamide are illustrative of aryl-substituted compounds formed in this manner, from which metal halide complexes of this invention may be formed.

In addition to the sulfenamide vulcanization accelerators mentioned above, other known sulfenamide accelerators which are suitable for preparation of the metal halide addition compounds of the invention are disclosed in the following United States patents: 2,271,834, 2,339,552, 2,367,827, 2,381,384, 2,381,392 and 2,445,722.

The zinc chloride addition products are accelerators of the vulcanization of natural rubber. The formation of the complex permits converting a low-melting or liquid sulfenamide, which is often unstable, into a higher-melting or solid compound, thus rendering the accelerator more stable or more easily handled. The addition products give a slower cure than the sulfenamides from which they are formed and are delayed-action accelerators. The vulcanized products are different from those produced with the sulfenamides. For instance, the zinc chloride addition compounds give a lower modulus natural rubber stock than an equal weight of the parent sulfenamides and may be used in obtaining softer stocks.

Other salts, such as the cupric chloride salts, may be used in the vulcanization of synthetic rubbers, etc., such as the rubber-like copolymer of butadiene and styrene, in which copper derivatives have no detrimental effect. The cadmium salts may be used in curing rubber and rubber-like materials.

The following examples are typical and illustrate the preparation and characterization of representative metal halide addition compounds of the invention.

*Example 1*

An ether solution of N-cyclohexyl benzothiazole sulfenamide was mixed with an ether solution of zinc chloride. The proportion of reactants was 2 moles sulfenamide to 1 mole zinc chloride. Immediate reaction occurred giving a quantitative yield of the addition product or salt, which was a white, granular solid, M. P. 150–160° C. This product had the formula:

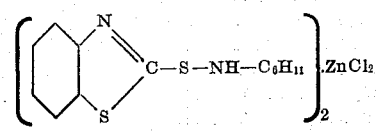

The melting point of the parent sulfenamide is 100–102° C.

The addition product was tested in rubber, using the corresponding sulfenamide as a control. The formula employed was:

| | Parts |
|---|---|
| Smoked sheet | 100 |
| Sulfur | 3 |
| Zinc oxide | 5 |
| Stearic acid | 1.10 |
| Accelerator | 0.75 |

The stocks were cured at two different temperatures for varying lengths of time. The time is expressed in minutes in the following table, which gives the modulus and tensile strength for the control and the test material in pounds per square inch:

| | 600% Modulus | | | | Tensile at Break | | | |
|---|---|---|---|---|---|---|---|---|
| | 30 | 60 | 90 | 120 | 30 | 60 | 90 | 120 |
| Cured at 240° F.: | | | | | | | | |
| Control | | | 750 | 1,800 | | | 2,650 | 3,600 |
| Test material | | | | 375 | | | | 2,100 |
| Cured at 280° F.: | | | | | | | | |
| Control | 2,500 | 2,300 | 1,825 | | 3,725 | 3,675 | 3,425 | |
| Test material | 1,350 | 1,525 | 1,300 | | 3,550 | 3,250 | 3,425 | |

The above results show that the zinc chloride addition compound affects the modulus more than the tensile strength and serves to prevent the stock from curing too stiff.

The zinc chloride salt of N-cyclopentamethylene cyclopentamethylene thiocarbamyl sulfenamide was similarly prepared. It was found to have a melting point of 110° C. as compared with a melting point of 100–102° C. for the parent sulfenamide. The formula for this compound is:

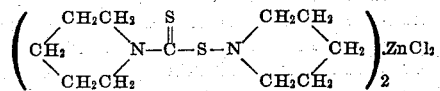

For the preparation of cupric salts, some other solvent than ether will be preferred, as, for example, ethyl alcohol.

*Example 2*

Seventeen grams CuCl₂.2H₂O were dissolved in 100 cc. of ethyl alcohol to form a dark green, clear solution. Fifty-three grams of N-cyclohexyl benzothiazole sulfenamide were dissolved in 700 cc. of ethyl alcohol to which was added 100 cc. of benzene. The two solutions were mixed and the mixture immediately became dark in color; after a few minutes a chocolate-brown solid separated out. The solid was washed twice with ether. The melting point of the product, N-cyclohexyl benzothiazole sulfenamide cupric chloride, was 160° C.

*Example 3*

To 56 grams (0.25 mole) of N-isopropyl benzothiazole sulfenamide (M. P. 97–99° C.) dissolved in 700 ml. of absolute ethyl alcohol there was added slowly 17 grams (0.125 mole) of U. S. P. zinc chloride dissolved in 100 ml. of ethyl alcohol. Precipitation was evident in 24 hours. After standing for one week the reaction mixture was filtered with suction. The white residue was ground under ether, filtered and dried at room temperature in vacuo. The yield of product was 19.5 grams, melting at 183° C. On analysis the product was found to contain 11.5% of zinc, agreeing with 11.2% of zinc calculated from the following formula:

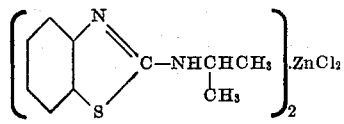

*Example 4*

Fifty-six grams (0.25 mole) of N-isopropyl benzothiazole sulfenamide and 16.8 grams (0.125 mole) of reagent grade anhydrous cupric chloride were reacted in accordance with the procedure of Example 3. A green-brown precipitate immediately formed, and this product was separated from the reaction mixture by filtration. The crude product was ground under anhydrous ether, filtered and dried in a vacuum. The dry product softened at about 220° C. but did not melt below 360° C. Calculated for copper: 17.8% (when $n$ in the formula is 1) and 10.9% (when $n$ in the formula is 2). Found: 14.1% copper, indicating that the product was a mixture of the two addition compounds. The product was then washed with hot toluene and dried. This purified product behaved the same as the original product upon heating (it did not melt under 360° C.) but analysis showed it to contain 16.7% of copper indicating that it consisted largely of the following compound:

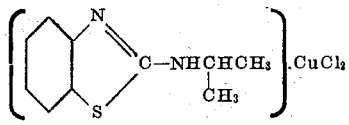

*Example 5*

The addition compound of Example 1 was again prepared, making use of purer reagents. Commercial N-cyclohexyl benzothiazole sulfenamide was recrystallized from anhydrous ethyl ether-petroleum ether mixture to a constant melting point of 102–104° C. To 36.9 grams (0.14 mole) of the purified sulfenamide dissolved in 700 ml. of anhydrous ethyl ether there was added slowly, with stirring, a clear, anhydrous ethyl ether solution containing 9.6 grams (0.07 mole) of U. S. P. zinc chloride. The resulting precipitate was filtered and dried; the yield was 39.2 grams. Calculated for zinc: 16.4% (when $n$ in the formula is 1) and 9.8% (when $n$ in the formula is 2). Found: 9.8% zinc (melting point, 164–169° C.). The product was then ground under ethyl ether, filtered, washed with hot toluene and again filtered, and dried. This "purified" product melted at 174–176° C. and analyzed 15.7% zinc, indicating that it consisted largely of the mole per mole addition compound, whereas the initial product consisted entirely of the addition compound of 2 moles of the sulfenamide to 1 mole of the zinc chloride.

Example 6

N-cyclohexyl-N',N'-diethyl thiocarbamyl sulfenamide was recrystallized from low boiling petroleum ether to a constant melting point of 67–68° C. To 61.5 grams (0.25 mole) of the pure sulfenamide dissolved in 250 ml. of anhydrous ethyl ether there was slowly added, with stirring, a clear 100 ml. ether solution containing 17.0 grams (0.125 mole) of zinc chloride. The precipitate, which formed immediately, was removed by filtration and dried in vacuo. The crude product was obtained in a yield of 64.1 grams, melting at 112–115° C. After recrystallization from a mixture of chloroform and low boiling petroleum ether, the product melted at 116–118° C. and was found by analysis to contain 10.0% of zinc, agreeing with 10.4% of zinc calculated from the following formula:

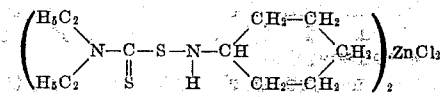

Example 7

To a methylal solution of N-cyclohexyl-N',N'-diethyl thiocarbamyl sulfenamide there was added a clear, green methylal solution of cupric chloride. A green solid precipitated immediately (weight 17.6 grams, M. P. 94–95° C.), which was recrystallized from methanol-petroleum ether to give the purified product, melting at 95–96° C. Calculated for copper (when $n$ in the formula is 1) 16.7%; found by analysis 16.4%.

Example 8

To 6 grams (0.026 mole) of pure N,N-dimethyl benzothiazole sulfenamide, melting at 40–41° C. (this sulfenamide is unstable, decomposing upon standing at room temperature) dissolved in ethyl ether there was added an ether solution containing 3.9 grams (0.0286 mole) of anhydrous zinc chloride. An immediate precipitate formed (8.3 grams), which was removed by filtration and dried. The product melted at 189–192° C.

Example 9

N,N-diethyl benzothiazole sulfenamide is a liquid which decomposes upon standing at room temperature. This sulfenamide was reacted with zinc chloride in accordance with the procedure of Example 8 to produce an addition compound melting at 131–134° C. When the reaction was carried out in a methylal solution (instead of in ether), a green addition compound was obtained, melting at 214–216° C.

Example 10

N-cyclotetramethylene - 2 - tetrahydrobenzothiazole sulfenamide is a liquid which decomposes upon standing. To an ether solution containing 1.0 gram (0.004 mole) of this sulfenamide there was slowly added, with stirring, an ethyl ether-tetrahydrofuran solution containing 0.54 gram (0.004 mole) of anhydrous zinc chloride. (The zinc chloride solution was prepared by dissolving the salt in a minimum quantity of tetrahydrofuran and diluting with ethyl ether.) The resulting precipitate was removed by filtration, washed with ethyl ether and dried. The addition compound, so-prepared, melted at 170° C.

Example 11

To a solution of N-cyclohexyl-2-thiazoline sulfenamide (M. P. 68–70° C.) in anhydrous ethyl ether there was added a saturated solution of anhydrous zinc chloride in anhydrous ethyl ether. The resulting precipitate was separated from the reaction solution and recrystallized from chloroform-low boiling petroleum ether. The crystalline product melted at 88–90° C. Analysis showed the product to contain 9.5% of zinc, indicating the following structure:

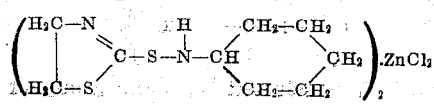

Thus, it is seen that the addition compounds of the invention are always higher melting, and therefore more stable and more easily handled, than the corresponding sulfenamides from which they are prepared. The compounds of the invention are delayed-action rubber vulcanization accelerators, and may have commercial value also as fungicides and insecticides, as well as other uses.

This application is a continuation-in-part of our copending application Serial No. 583,858, filed March 20, 1945, now Patent No. 2,476,818.

What we claim is:

1. Compounds having the formula

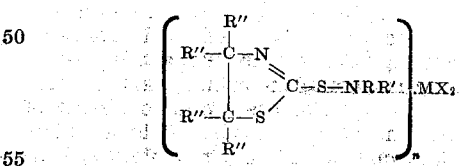

where R is selected from the group of radicals consisting of hydrogen, hydrocarbon alkyl, hydrocarbon aryl, hydrocarbon aralkyl, furfuryl and tetrahydrofurfuryl, R' is selected from the goup of radicals consisting of hydrogen, hydrocarbon alkyl, hydrocarbon aryl, hydrocarbon aralkyl, furfuryl and tetrahydrofurfuryl, also where NRR' is a heterocyclic radical in which RR' is selected from the group consisting of alkylene and alkylene-oxy-alkylene, R'' is selected from the group of radicals consisting of hydrogen, hydrocarbon alkyl, hydrocarbon aryl, hydrocarbon aralkyl, furfuryl and tetrahydrofurfuryl, $MX_2$ is a complex-forming salt in which M is a bivalent metal of the group consisting of zinc, copper and cadmium and X is a halide radical of the class consisting of chlorine, bromine and iodine, and $n$ is selected from the group consisting of 1 and 2.

2. Compounds having the formula

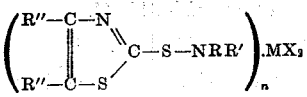

where R is selected from the group of radicals consisting of hydrogen, hydrocarbon alkyl, hydrocarbon aryl, hydrocarbon aralkyl, furfuryl and tetrahydrofurfuryl, R' is selected from the group of radicals consisting of hydrogen, hydrocarbon alkyl, hydrocarbon aryl, hydrocarbon aralkyl, furfuryl and tetrahydrofurfuryl, also where NRR' is a heterocyclic radical in which RR' is selected from the group consisting of alkylene and alkylene-oxy-alkylene, R'' is selected from the group of radicals consisting of hydrogen, hydrocarbon alkyl, hydrocarbon aryl, hydrocarbon aralkyl, furfuryl and tetrahydrofurfuryl, also where the two R'' form with the double-bonded carbons a radical from the group consisting of arylene and partially hydrogenated arylene, $MX_2$ is a complex-forming salt in which M is a bivalent metal of the group consisting of zinc, copper and cadmium and X is a halide radical of the class consisting of chlorine, bromine and iodine, and $n$ is selected from the group consisting of 1 and 2.

3. Compounds having the formula

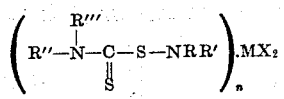

in which R is selected from the group of radicals consisting of hydrogen, hydrocarbon alkyl, hydrocarbon aryl, hydrocarbon aralkyl, furfuryl and tetrahydrofurfuryl, R' is selected from the goup of radicals consisting of hydrogen, hydrocarbon alkyl, hydrocarbon aryl, hydrocarbon aralkyl, furfuryl and tetrahydrofurfuryl, also where NRR' is a heterocyclic radical in which RR' is selected from the group consisting of alkylene and alkylene-oxy-alkylene, R'' is selected from the group of radicals consisting of hydrogen, hydrocarbon alkyl, hydrocarbon aryl, hydrocarbon aralkyl, furfuryl and tetrahydrofurfuryl, R''' is selected from the group of radicals consisting of hydrocarbon alkyl, hydrocarbon aryl, hydrocarbon aralkyl, furfuryl and tetrahydrofurfuryl, also where NR''R''' is a heterocyclic radical in which R''R''' is selected from the group consisting of alkylene and alkylene-oxy-alkylene, $MX_2$ is a complex-forming salt in which M is a bivalent metal of the group consisting of zinc, copper and cadmium and X is a halide radical of the class consisting of chlorine, bromine and iodine, and $n$ is selected from the group consisting of 1 and 2.

4. An addition compound of (1) a halide of a bivalent metal of the group consisting of zinc, copper and cadmium and (2) a sulfenamide of the group consisting of thiazole sulfenamides, thiazoline sulfenamides and thiocarbamyl sulfenamides, said sulfenamide being an accelerator of rubber vulcanization.

5. N-cyclohexyl-N',N'-diethyl thiocarbamyl sulfenamide zinc chloride.

6. N-cyclohexyl benzothiazole sulfenamide zinc chloride.

7. N,N-diethyl benzothiazole sulfenamide zinc chloride.

8. A bivalent metal halide addition compound of a sulfenamide of the group consisting of a thiazole sulfenamide, a thiazoline sulfenamide and a thiocarbamyl sulfenamide, said metal being selected from the group consisting of zinc, copper and cadmium.

9. A zinc chloride addition compound of a thiazole sulfenamide.

10. A bivalent metal halide addition compound of a thiazoline sulfenamide, said metal being selected from the group consisting of zinc, copper and cadmium.

11. A bivalent metal halide addition compound of a thiocarbamyl sulfenamide, said metal being selected from the group consisting of zinc, copper and cadmium.

12. The method of making an addition compound which comprises reacting a bivalent metal halide and a sulfenamide of the group consisting of a thiazole sulfenamide, a thiazoline sulfenamide and a thiocarbamyl sulfenamide, said metal being selected from the group consisting of zinc, copper and cadmium.

13. The method of claim 12 in which the reaction is carried out in the presence of a solvent.

14. The method of claim 12 in which the reaction is carried out in the presence of a solvent for the sulfenamide.

15. The method of claim 12 in which the reaction is carried out in the presence of a solvent for the bivalent metal halide.

16. N-cyclohexyl-2-thiazoline sulfenamide zinc chloride.

17. N-cyclohexyl-N',N'-diethyl thiocarbamyl sulfenamide cupric chloride.

EDWARD L. CARR.
JOHN RICHARD RAFTER.

No references cited.